United States Patent
Won et al.

(10) Patent No.: US 10,237,800 B2
(45) Date of Patent: Mar. 19, 2019

(54) METHOD AND DEVICE FOR DISTRIBUTING IDLE USER EQUIPMENT IN MULTI-CARRIER BASED MOBILE COMMUNICATION SYSTEM

(71) Applicant: Samsung Electronics Co., Ltd., Gyeonggi-do (KR)

(72) Inventors: Jeong-Jae Won, Gyeonggi-do (KR); Dae-Joong Kim, Gyeonggi-do (KR); Han-Seok Kim, Seoul (KR); Abhishek Roy, Gyeonggi-do (KR); Hwa Jin Cha, Gyeonggi-do (KR); Jung Min Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/144,634

(22) Filed: May 2, 2016

(65) Prior Publication Data

US 2016/0249265 A1    Aug. 25, 2016

Related U.S. Application Data

(63) Continuation of application No. 14/358,711, filed as application No. PCT/KR2012/009690 on Nov. 15, 2012, now Pat. No. 9,332,470.

(30) Foreign Application Priority Data

Nov. 15, 2011 (KR) .................... 10-2011-0118891

(51) Int. Cl.
H04W 36/22       (2009.01)
H04W 36/36       (2009.01)
(Continued)

(52) U.S. Cl.
CPC .......... *H04W 36/22* (2013.01); *H04W 28/08* (2013.01); *H04W 36/0072* (2013.01);
(Continued)

(58) Field of Classification Search
CPC . H04W 36/22; H04W 36/36; H04W 36/0072; H04W 48/12; H04W 48/20
(Continued)

(56) References Cited

U.S. PATENT DOCUMENTS 4,521,915 A    6/1985  Baker et al.
8,489,604 B1   7/2013  Sadovsky et al.
(Continued)

FOREIGN PATENT DOCUMENTS

CN    101044721    9/2007
CN    101562848    10/2009
(Continued)

OTHER PUBLICATIONS

International Search Report dated Mar. 26, 2013 in connection with International Patent Application No. PCT/KR2012/009690, 5 pages.
(Continued)

*Primary Examiner* — Inder P Mehra (57) ABSTRACT

The present invention relates to a method and device for distributing idle UE by a carrier in eNB of a multi-carrier based mobile communication system. The method of distributing idle UE in a multi-carrier based mobile communication system according to the present invention includes a process of determining a search rate by a carrier on the basis of information representing load on the carrier, a step of determining a cell reselection priority on the idle UE on the basis of the determined search rate, and a process of transmitting the determined cell reselection priority to the idle UE.

11 Claims, 8 Drawing Sheets

(51) Int. Cl.
*H04W 36/00* (2009.01)
*H04W 28/08* (2009.01)
*H04W 48/12* (2009.01)
*H04W 48/20* (2009.01)

(52) U.S. Cl.
CPC .......... *H04W 36/36* (2013.01); *H04W 48/12* (2013.01); *H04W 48/20* (2013.01)

(58) Field of Classification Search
USPC .............. 455/434, 455, 528, 435.3; 370/237
See application file for complete search history.

(56) References Cited

U.S. PATENT DOCUMENTS

| | | | |
|---|---|---|---|
| 2008/0043623 A1 | 2/2008 | Franceschini et al. | |
| 2008/0242308 A1 | 10/2008 | Gunnarsson et al. | |
| 2009/0239537 A1 | 9/2009 | Iwamura et al. | |
| 2010/0220652 A1 | 9/2010 | Ishii et al. | |
| 2010/0261496 A1 | 10/2010 | Fukumoto | |
| 2010/0291956 A1* | 11/2010 | Iwamura | H04W 48/20 455/509 |
| 2012/0120802 A1 | 5/2012 | Mach et al. | |
| 2012/0214500 A1* | 8/2012 | Lv | H04B 7/0456 455/450 |
| 2013/0003580 A1* | 1/2013 | Kovacs | H04W 72/082 370/252 |
| 2014/0004862 A1* | 1/2014 | Ekemark | H04W 72/06 455/443 |

FOREIGN PATENT DOCUMENTS

| | | |
|---|---|---|
| CN | 101588605 | 11/2009 |
| CN | 102111890 | 6/2011 |
| KR | 10-2008-0074916 | 8/2008 |
| KR | 10-2009-0045242 | 5/2009 |
| KR | 1020100021576 | 2/2010 |
| KR | 10-2010-0062862 | 6/2010 |

OTHER PUBLICATIONS

Written Opinion of International Searching Authority dated Mar. 26, 2013 in connection with International Patent Application No. PCT/KR2012/009690, 4 pages.

Nokia, "Considersations on CSG Reselection Requirements", 3GPP TSG-RAN WG4 Meeting #2010AH02, R4-102501, Bratislava, Slovakia, Jun. 28-Jul. 2, 2010, 7 pages.

Motorola, "Inter-Frequency and Inter-Rat Mobility Measurements During RRC_IDLE", 3GPP TSG RAN WG4 (Radio) Meeting #46, R4-080326, Sorrento, Italy, Feb. 11-15, 2008, 2 pages.

First Office Action dated Aug. 2, 2016 in connection with Chinese Application No. 201280067128.9, 8 pages.

Communication from a foreign patent office in a counterpart foreign application, Korean Intellectual Property Office, "Notification of the Reasons for Rejection," Application No. KR 10-2012-0129798, dated Oct. 22, 2018, 12 pages.

* cited by examiner

METHOD AND DEVICE FOR DISTRIBUTING IDLE USER EQUIPMENT IN MULTI-CARRIER BASED MOBILE COMMUNICATION SYSTEM

The present application is a continuation of U.S. Non-Provisional patent application Ser. No. 14/358,711 filed May 15, 2014 and entitled "METHOD AND DEVICE FOR DISTRIBUTING IDLE USER EQUIPMENT IN MULTI-CARRIER BASED MOBILE COMMUNICATION SYSTEM," which is a national stage filing of Patent Cooperation Treaty Patent Application No. PCT/KR2012/009690 filed Nov. 15, 2012, and entitled "METHOD AND DEVICE FOR DISTRIBUTING IDLE USER EQUIPMENT IN MULTI-CARRIER BASED MOBILE COMMUNICATION SYSTEM," which claims priority under 35 U.S.C. § 365 and/or 35 U.S.C. § 119(a) to Korean Patent Application No. 10-2011-0118891 filed Nov. 15, 2011, and entitled "METHOD AND APPARATUS FOR DISTRIBUTING IDLE USER EQUIPMENT IN A MOBILE COMMUNICATION SYSTEM BASED ON MULTI CARRIER." The content of the above-identified patent documents is incorporated herein by reference.

TECHNICAL FILED

The present disclosure relates to a mobile communication system, and more particularly, to a method and a device in which an evolved node B (eNB) of a multi-carrier based mobile communication system distributes a user equipment (UE) in an idle mode (hereinafter, referred to as 'idle UE') by a carrier.

BACKGROUND ART

In a conventional 3GPP (3rd Generation Partnership Project) system, an eNB has one carrier for each cell, and a UE accesses the one carrier to receive a service. In the conventional 3GPP system, a cell selection process and an RRC (Radio Resource Control) connection setting process of the UE are as follows.

In initial start or a change in a radio environment, the UE searches for the most suitable cell through a cell selection/reselection process, receives system information from an eNB of the searched cell, and camps on the searched cell. Then, when a call is started or a paging process is performed in a network, the UE sets an RRC connection through a random access process.

In the conventional art, an operation for dynamically changing priority based on load by a carrier has not been performed for a UE, RRC connections of which are released, based on load by a carrier. It is necessary to provide a method for efficiently distributing a UE, RRC connections of which are released, on the basis of information representing load on each carrier that is used in a multi-carrier based 3GPP LTE system.

DISCLOSURE OF DISCLOSURE

Technical Problem

The disclosure has been made to solve the above-mentioned problem in the prior art, and an aspect of the present disclosure is to provide a method and a device for efficiently distributing a UE in a multi-carrier based mobile communication system.

Another aspect of the present disclosure is to provide a method and a device for distributing a UE on the basis of information representing load on each carrier that is used in a mobile communication system.

Means to Solve the Problem

In accordance with an aspect of the present disclosure, a method for distributing an idle user equipment in a multi-carrier based mobile communication system includes the steps of: determining a search rate by a carrier on a basis of information representing load on a carrier; determining cell reselection priority for the idle user equipment on a basis of the determined search rate; and transmitting the determined cell reselection priority to the idle user equipment.

In accordance with an aspect of the present disclosure, a method for distributing an idle user equipment in a multi-carrier based mobile communication system includes the steps of: determining a cell reselection search rate by a carrier on a basis of information representing a predetermined number of cell load averages by a carrier; determining cell reselection priority for the idle user equipment on a basis of the determined search rate; and transmitting information representing the determined cell reselection priority to the idle user equipment.

In accordance with an aspect of the present disclosure, a method for distributing an idle user equipment in a multi-carrier based mobile communication system includes the steps of: determining a cell reselection search rate by a carrier on a basis of information representing distribution of active user equipments; determining cell reselection priority for the idle user equipment on a basis of the determined search rate; and transmitting information representing the determined cell reselection priority to the idle user equipment.

In accordance with an aspect of the present disclosure, an apparatus for distributing an idle user equipment in a multi-carrier based mobile communication system includes: a control unit that determines a search rate by a carrier on a basis of information representing load on a carrier, and determines cell reselection priority for the idle user equipment on a basis of the determined search rate; and a transmission unit that transmits the determined cell reselection priority to the idle user equipment.

In accordance with an aspect of the present disclosure, an apparatus for distributing an idle user equipment in a multi-carrier based mobile communication system includes: a control unit that determines a cell reselection search rate by a carrier on a basis of information representing a predetermined number of cell load averages by a carrier, and determines cell reselection priority for the idle user equipment on a basis of the determined search rate; and a transmission unit that transmits information representing the determined cell reselection priority to the idle user equipment.

In accordance with an aspect of the present disclosure, an apparatus for distributing an idle user equipment in a multi-carrier based mobile communication system includes: a control unit that determines a cell reselection search rate by a carrier on a basis of information representing distribution of active user equipments, and determines cell reselection priority for the idle user equipment on a basis of the determined search rate; and a transmission unit that transmits information representing the determined cell reselection priority to the idle user equipment.

Advantageous Effect

According to the embodiments of the aforementioned present disclosure, it is possible to distribute a UE on the basis of carrier distribution and an active UE. Furthermore, it is possible to adjust load between carriers.

BEST MODE FOR THE DISCLOSURE

In the following description of embodiments of the present disclosure, a detailed description of known functions or configurations incorporated herein will be omitted when it is determined that the detailed description thereof may unnecessarily obscure the subject matter of the present disclosure. Hereinafter, embodiments of the present disclosure will be described with reference to the accompanying drawings.

A multi-carrier mobile communication system according to embodiments of the present disclosure includes an eNB and a UE capable of using at least two carriers. Particularly, in a call connection, the UE is configured to use at least one carrier that is provided by the eNB according to UE information. Consequently, in the mobile communication system according to the embodiments of the present disclosure, it is possible to reduce a connection attempt rate to an overloaded cell in a call connection.

Figure 1:
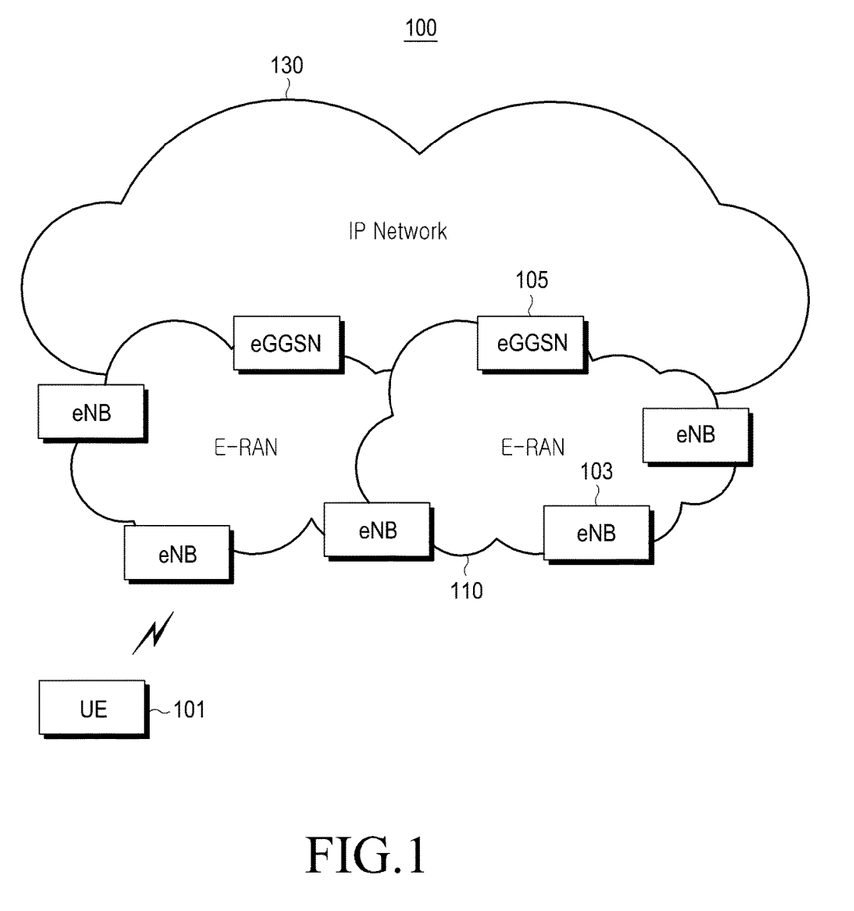
FIG. 1 is a diagram illustrating a mobile communication system to which the present disclosure is applied.

FIG. 1 is a diagram illustrating a mobile communication system to which the present disclosure is applied. A mobile communication system 100 illustrated in FIG. 1 is a 3GPP LTE system; however, a mobile communication system of the present disclosure is not limited to the 3GPP LTE system.

Referring to FIG. 1, the mobile communication system 100 may be simplified to have a 2-node structure of a plurality of eNBs 103 and a plurality of eGGSNs (enhanced Gateway GPRS (General Packet Radio Service) Support Nodes) 105.

A UE 101 may connect to an Internet protocol network 130 by an E-RAN (Enhanced-Radio Access Network) 110. The eNBs 103 are connected to the UE 101 through radio channels. One eNB 103 includes a plurality of cells, and the UE 101 may connect to at least two cells of the eNB 103.

The UE 101 repeats an operation for waking up at a fixed time, monitoring a predetermined channel for a predetermined period, and then shifting to a sleep mode. At this time, when an appropriate cell is found in an idle mode, the UE 101 performs a cell selection/reselection process. That is, the UE 101 performs an appropriate cell selection/reselection process in order to acquire downlink synchronization in the idle mode and receive system information and the like of a corresponding cell. However, in a multi-carrier environment, since a plurality of carriers exist, a carrier selection process should be included in the cell selection/reselection process.

In a conventional mobile communication system, such cell selection/reselection has been performed for an appropriate cell by the UE 101 regardless of a current load state of a carrier. Also in a multi-carrier based mobile communication system, in the case of carrier selection, a load adjustment algorithm has not been applied to a cell selection process of the UE 101. Therefore, in a UE connection, a connection attempt to an overloaded cell has not been controlled.

Embodiments of the present disclosure are for providing the UE 101 with a search rate and cell reselection priority by a carrier on the basis of information representing load on each carrier that is used in a mobile communication system in which the eNB 103 distributes a UE, and in detail, the eNB 103 determines cell reselection priority and a search rate for each carrier according to embodiments (predetermined conditions) of the present disclosure, and transmits information representing the cell reselection priority to the UE 101. The search rate, for example, has a low value as the load (the congestion state) of a carrier available in at least one cell is large. Accordingly, a carrier with low load (that is, a carrier with relatively high availability) has a high search rate, and a carrier with relatively large load has a low search rate.

Then, the UE 101 receives the information representing the cell reselection priority for each carrier, and selects a carrier with the highest priority as a cell reselection target carrier. The information representing load for each carrier includes at least one of information representing carrier distribution and information representing distribution of active UEs, wherein the information representing carrier distribution indicates distribution of the number of eNBs (or cells) using the same frequency band among Enbs managed by an RAN EMS (Element Management System), and the information representing distribution of active UEs indicates distribution of the number of active UEs by each frequency band being operated in one eNB.

To this end, a method and a device, in which the eNB 103 of a multi-carrier based mobile communication system according to the embodiments of the present disclosure distributes the UE 101 for each carrier, will be described in detail.

Firstly, a method, in which the eNB 103 transmits information representing cell reselection priority for each carrier to the UE 101 in order to distribute the UE 101 for each carrier in the embodiments of the present disclosure, is as follows.

In a first embodiment of the present disclosure, an operator sets cell reselection priority and a search rate that are fixed by a carrier. That is, the eNB 103 according to the first embodiment of the present disclosure receives the cell reselection priority and the search rate, which are fixed by a carrier, from the operator, and transmits information representing the received cell reselection priority fixed by a carrier to the UE 101.

In second and third embodiments of the present disclosure, the cell reselection priority and the search rate are determined on the basis of carrier distribution. That is, the eNB 103 according to the second embodiment of the present disclosure receives the cell reselection priority fixed by a carrier from the operator, determines the search rate by a carrier on the basis of the carrier distribution, and transmits information representing the received cell reselection priority fixed by a carrier to the UE 101. Furthermore, the eNB 103 according to the third embodiment determines the cell reselection priority and the search rate by a carrier on the basis of the carrier distribution, and transmits information representing the determined cell reselection priority to the UE 101.

In fourth and fifth embodiments of the present disclosure, the cell reselection priority and the search rate are dynamically determined on the basis of distribution of active UEs by a carrier. The active UE indicates a UE in an active state. That is, the eNB 103 according to the fourth embodiment of the present disclosure receives the cell reselection priority fixed by a carrier from the operator, determines the search rate by a carrier on the basis of the distribution of the active UEs, and transmits information representing the received cell reselection priority fixed by a carrier to the UE 101. Furthermore, the eNB 103 according to the fifth embodiment of the present disclosure determines the cell reselection priority and the search rate by a carrier on the basis of the distribution of the active UEs, and transmits information representing the determined cell reselection priority to the UE 101.

Furthermore, in a sixth embodiment of the present disclosure, the cell reselection priority and the search rate are dynamically determined on the basis of cell load average information by a carrier. That is, the eNB 103 according to the sixth embodiment of the present disclosure determines the cell reselection priority and the search rate on the basis of the cell load average information by a carrier, and transmits information representing the determined cell reselection priority to the UE 101. The operation of the eNB 103, for example, may also be operated in a SON (Self Optimizing Network) server.

In another embodiment of the aforementioned first to sixth embodiments, the eNB 103 may determine a search rate by a carrier on the basis of information representing load for a carrier such as carrier distribution, distribution of active UEs, distribution of the number of eNBs using the same frequency band, or a cell load average, determine cell reselection priority for a corresponding idle UE on the basis of the determined search rate, and then transmit the determined cell reselection priority to the idle UE.

Hereinafter, the first to sixth embodiments of the present disclosure will be described in detail with reference to the accompanying tables and drawings.

The eNB 103 according to the first embodiment of the present disclosure receives the cell reselection priority and the search rate, which are fixed by a carrier, from the operator. A method, in which the operator determines the cell reselection priority and the search rate, which are fixed by a carrier, may be shown in Table 1 below as one example.

TABLE 1

| Bandclass | Carrier (ARFCN) (system parameter) | Cell reselection priority | Search rate (optional) | Cell reselection probability per carrier (optional) |
|---|---|---|---|---|
| 1.9 GHz | Aaaa | 7 | 6 | 6/10 |
| 800M | Bbbb | 5 | 3 | 3/10 |
| ZZ frq#1 | Cccc | 3 | 1 | 1/10 |

In Table 1 above, the "Carrier (ARFCN: Absolute Radio Frequency Channel Number)" indicates an identifier of a carrier. The cell reselection priority, for example, has values of 0 to 7 in an LTE system, and a priority is high as the cell reselection priority has a high value.

The eNB 103 transmits the cell reselection priority fixed by a carrier and received from the operator to the UE 101 through a system information block (SIB) or an RRC connection release message. The eNB assigns a cell reselection priority value to a UE on the basis of a search rate by a carrier in which an RRC connection is released. In Table 1 above, the cell reselection probability per carrier indicates a ratio by which the cell reselection priority value is assigned to each UE on the basis of the search rate by a carrier.

In another embodiment of the present disclosure, the eNB 103 can determine again cell reselection priority, which is to be transmitted to a corresponding UE, on the basis of the search rate. For example, in Table 1 above, for RRC connection release target UE of 30% (corresponding to the search rate of "3"), cell reselection priority of a carrier Bbbb, for example, is set to "7" from "5" again and cell reselection priority of a carrier Aaaa, for example, is set to a value lower than "7" again. Then, information representing the cell reselection priority determined (set) again in the aforementioned scheme is transmitted to the corresponding UE. In the case of the above example, the identifier (Carrier (ARFCN)) of the corresponding carrier Bbbb and the value of "7" that is the cell reselection priority determined again, the identifier of the carrier Aaaa and a value lower than "6" that is the cell reselection priority determined again, an identifier of a carrier Cccc and a value lower than "6" that is the cell reselection priority determined again are provided to the RRC connection release target UE of 30% (corresponding to the search rate of "3") as information representing the cell reselection priority. A scheme of determining the aforementioned cell reselection priority again may also be applied to the following second to sixth embodiments in the same manner.

Figure 2:
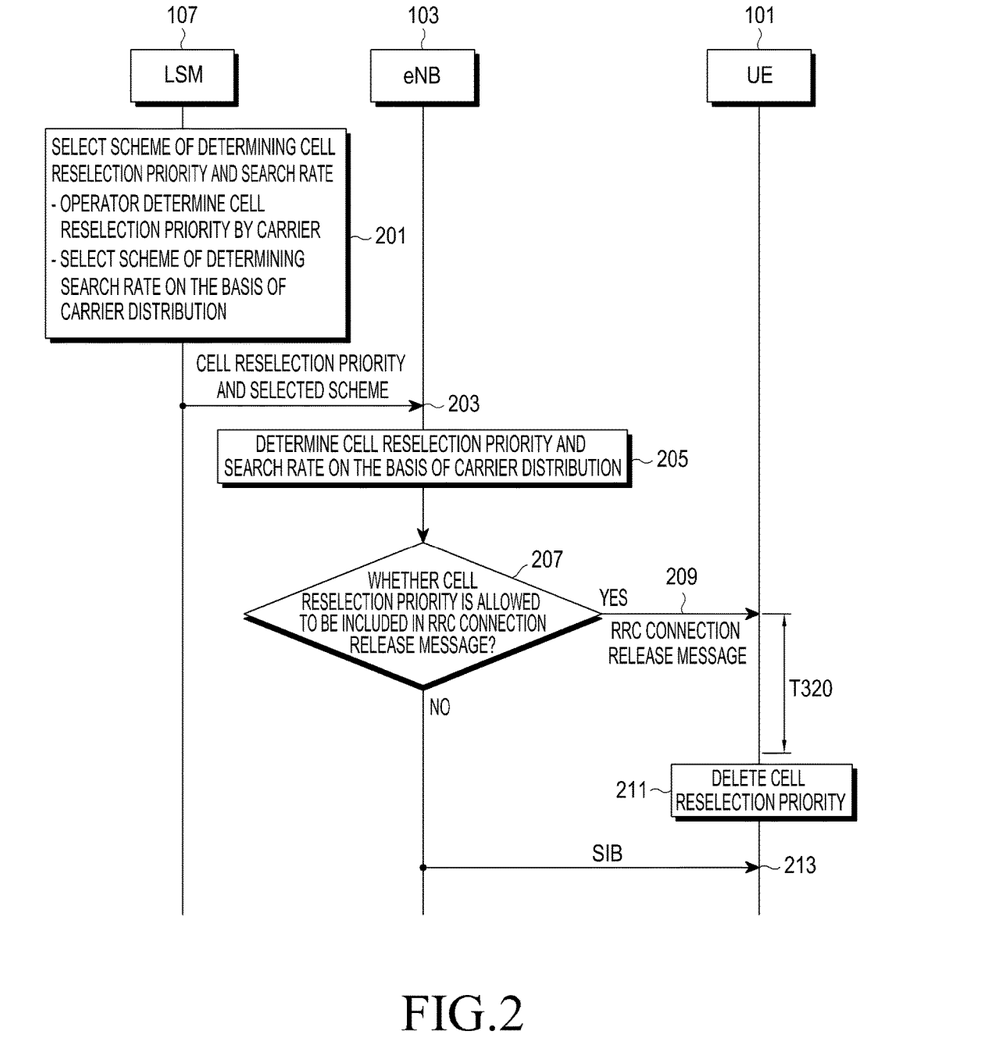
FIG. 2 is a flowchart illustrating a method for distributing an idle UE by a carrier in a mobile communication system according to a second embodiment of the present disclosure.

FIG. 2 is a flowchart illustrating a method for distributing an idle UE by a carrier in the mobile communication system according to the second embodiment of the present disclosure.

Referring to FIG. 2, in step S201, an LTE system manager (LSM) 107 selects a scheme of determining cell reselection priority and a search rate. An operator of the LSM 107 determines cell reselection priority by a carrier according to the second embodiment of the present disclosure among the embodiments of the present disclosure, and selects a scheme in which the eNB 103 determines a search rate on the basis of carrier distribution. In step S203, the LSM 107 transmits the cell reselection priority fixed by a carrier and determined by the operator and the selected scheme to the eNB 103.

In step S205, the eNB 103 receives the cell reselection priority fixed by a carrier and the selected scheme from the LSM 107, monitors carrier distribution according to the selected scheme, and determines the search rate by a carrier on the basis of the monitored carrier distribution. A scheme, in which the eNB 103 determines the search rate by a carrier on the basis of the carrier distribution, may be shown in Table 2 below as one example.

TABLE 2

| Bandclass | Carrier (ARFCN) (system parameter) | Cell reselection priority (operator setting value) | Carrier distribution | Search rate | Cell reselection probability per carrier |
|---|---|---|---|---|---|
| 1.9 GHz | Aaaa | 7 | 0.7 | 7 | 7/10 |
| 800M | Bbbb | 5 | 0.2 | 2 | 2/10 |
| ZZ frq#1 | Cccc | 3 | 0.1 | 1 | 1/10 |

In Table 2 above, the carrier distribution may be determined using Equation 1 below, the search rate by a carrier may be determined using Equation 2 below, and the cell reselection probability per carrier may be determined using Equation 3 below.

$$d_i = \frac{C_i}{c} \quad \text{Equation 1}$$

In Equation 1 above, di indicates carrier distribution, Ci indicates the number of carriers i in an eNB, and c indicates the maximum number of carriers in the eNB.

$$S_i = d_i * 10 \quad \text{Equation 2}$$

$$P_i = \frac{s_i}{\sum_{i=1}^{k} s_i} \quad \text{Equation 3}$$

In Equation 3 above, si indicates a search rate of a carrier i, and k indicates the total number of carriers of a multi-carrier mobile communication network. In step S207, the eNB 103 determines whether the cell reselection priority fixed by a carrier is allowed to be included in an RRC connection release message. When the cell reselection priority fixed by a carrier is allowed to be included in the RRC connection release message, the eNB 103 transmits the RRC connection release message including the cell reselection priority fixed by a carrier to the UE 101 in step S209. When a preset timer is expired, the UE 101 deletes the reselection priority received through the RRC connection release message in step S211. When the cell reselection priority fixed by a carrier is not allowed to be included in the RRC connection release message, the eNB 103 transmits the cell reselection priority fixed by a carrier to the UE 101 through a system information block (SIB) in step S213. The SIB may be SIB5.

Figure 3:
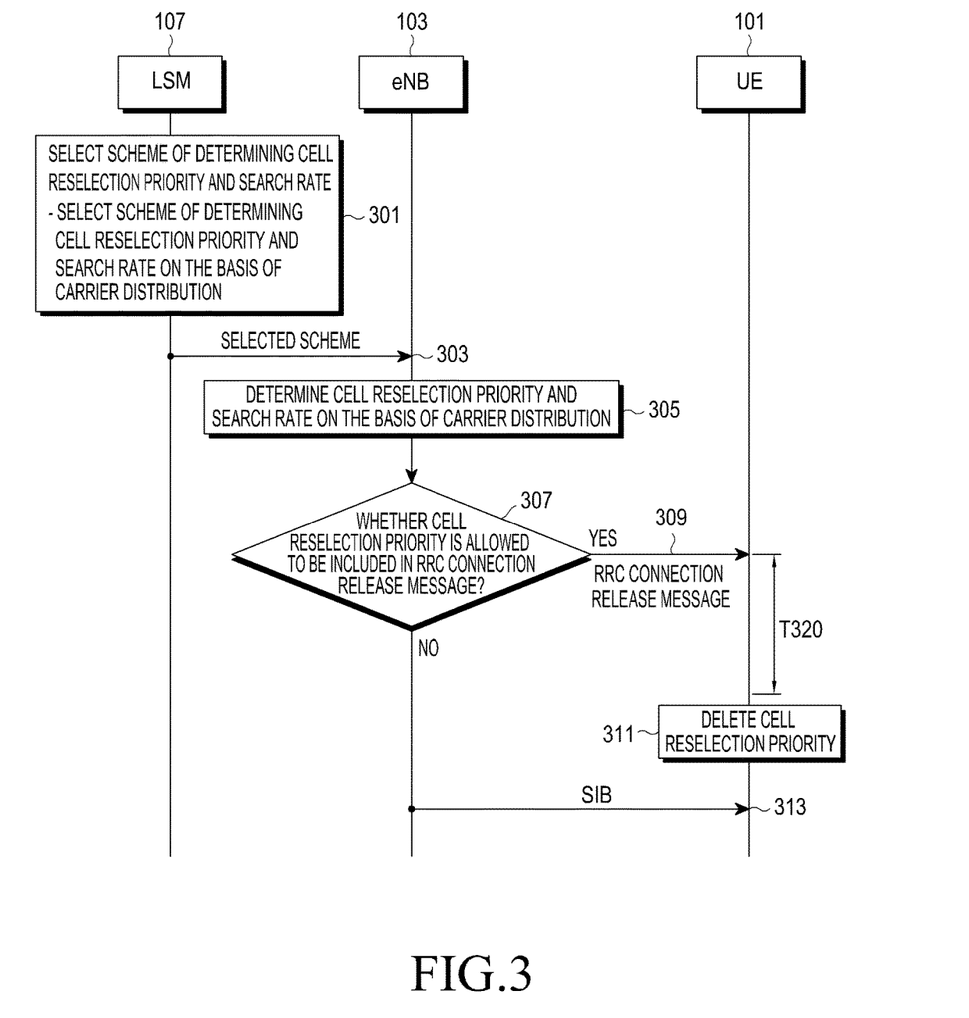
FIG. 3 is a flowchart illustrating a method for distributing an idle UE by a carrier in a mobile communication system according to a third embodiment of the present disclosure.

FIG. 3 is a flowchart illustrating a method for distributing an idle UE by a carrier in the mobile communication system according to the third embodiment of the present disclosure.

Referring to FIG. 3, in step S301, the LSM 107 selects a scheme of determining the cell reselection priority and the search rate. The LSM 107 selects a scheme in which the eNB 103 determines the cell reselection priority and the search rate by a carrier on the basis of carrier distribution according to the third embodiment of the present disclosure among the embodiments of the present disclosure. In step S303, the LSM 107 transmits the selected scheme to the eNB 103 such that the eNB 103 operates according to the third embodiment of the present disclosure.

Then, in step S305, the eNB 103 monitors carrier distribution, and determines the cell reselection priority and the search rate by a carrier the basis of the monitored carrier distribution. A scheme, in which the eNB 103 determines the cell reselection priority and the search rate by a carrier on the basis of the carrier distribution, may be shown in Table 3 below as one example.

TABLE 3

| Bandclass | Carrier (ARFCN) (system parameter) | Carrier distribution | Cell reselection priority | Search rate | Cell reselection probability per carrier |
|---|---|---|---|---|---|
| 1.9 GHz | Aaaa | 0.7 | 7 | 7 | 7/10 |
| 800M | Bbbb | 0.2 | 6 | 2 | 2/10 |
| ZZ frq#1 | Cccc | 0.1 | 5 | 1 | 1/10 |

In Table 3 above, the carrier distribution, the search rate by a carrier, and the cell reselection probability per carrier are determined using Equation 1, Equation 2, and Equation 3 above. Furthermore, when the search rate of the carrier i has the largest value, since availability is large, the cell reselection priority by a carrier is assigned in sequence of {7,6,5,4,3,2,1}.

In step S307, the eNB 103 determines whether the determined cell reselection priority by a carrier is allowed to be included in the RRC connection release message. When the determined cell reselection priority by a carrier is allowed to be included in the RRC connection release message, the eNB 103 transmits the determined cell reselection priority by a carrier to the UE 101 through the RRC connection release message in step S309. When a preset timer is expired, the UE 101 deletes the reselection priority received through the RRC connection release message in step S311. When the determined cell reselection priority by a carrier is not allowed to be included in the RRC connection release message, the eNB 103 transmits the determined cell reselection priority by a carrier to the UE 101 through the SIB in step S313.

Figure 4:
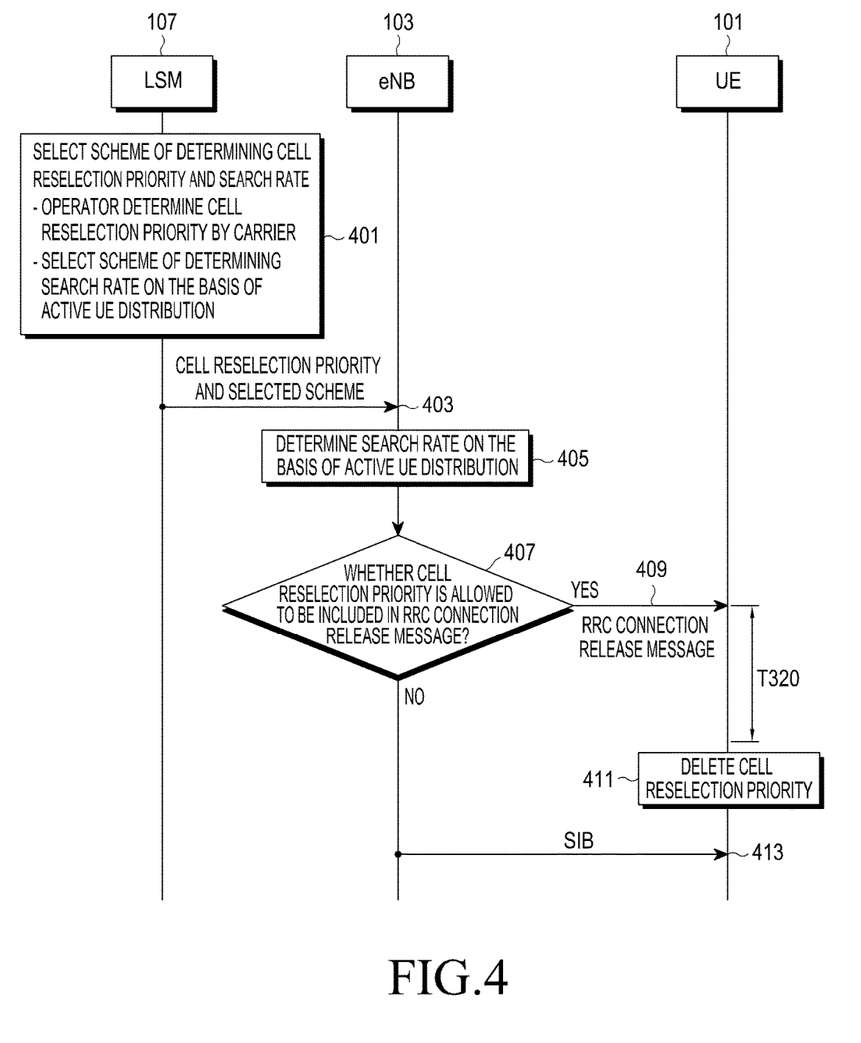
FIG. 4 is a flowchart illustrating a method for distributing an idle UE by a carrier in a mobile communication system according to a fourth embodiment of the present disclosure.

FIG. 4 is a flowchart illustrating a method for distributing an idle UE by a carrier in the mobile communication system according to the fourth embodiment of the present disclosure.

Referring to FIG. 4, in step S401, the LSM 107 selects a scheme of determining the cell reselection priority and the search rate. An operator of the LSM 107 determines the cell reselection priority fixed by a carrier according to the fourth embodiment of the present disclosure among the embodiments of the present disclosure, and selects a scheme in which the eNB 103 determines the search rate by a carrier on the basis of active UE distribution. In step S403, the LSM 107 transmits the cell reselection priority fixed by a carrier and determined by the operator and the selected scheme to the eNB 103.

In step S405, the eNB 103 receives the cell reselection priority fixed by a carrier and the selected scheme from the LSM 107, and determines the search rate by a carrier on the basis of the active UE. A scheme, in which the eNB 103 determines the search rate by a carrier on the basis of the carrier distribution, may be shown in Table 4 below as one example.

TABLE 4

| Bandclass | Carrier (ARFCN) (system parameter) | Cell reselection priority | Active UE Load rate (Active UE/Maximum UE/carrier) | Search rate | Cell reselection probability per carrier |
|---|---|---|---|---|---|
| 1.9 GHz | Aaaa | 7 | 0.4 | 6 | 6/10 |
| 800M | Bbbb | 5 | 0.7 | 3 | 3/10 |
| ZZ frq#1 | Cccc | 3 | 0.9 | 1 | 1/10 |

In Table 4 above, the carrier distribution may be determined using Equation 4 below, the search rate by a carrier may be determined using Equation 5 below, and the cell reselection probability per carrier may be determined using Equation 6 below.

$$r_i = \frac{N_i}{M_i} \qquad \text{Equation 4}$$

In Equation 4 above, ri indicates carrier distribution, Ni indicates the number of active UEs in the carrier i, and Mi indicates the permissible maximum number of UEs in the carrier i.

$$S_i = (1 - r_i) * 10 \qquad \text{Equation 5}$$

$$P_i = \frac{S_i}{\sum_{i=1}^{k} S_i} \qquad \text{Equation 6}$$

Then, in step S407, the eNB 103 determines whether the cell reselection priority fixed by a carrier is allowed to be included in the RRC connection release message. When the cell reselection priority fixed by a carrier is allowed to be included in the RRC connection release message, the eNB 103 transmits the cell reselection priority fixed by a carrier to the UE 101 through the RRC connection release message in step S409. When a preset timer is expired, the UE 101 deletes the reselection priority received through the RRC connection release message in step S411. When the cell reselection priority fixed by a carrier is not allowed to be included in the RRC connection release message, the eNB 103 transmits the cell reselection priority fixed by a carrier to the UE 101 through the SIB in step S413.

Figure 5:
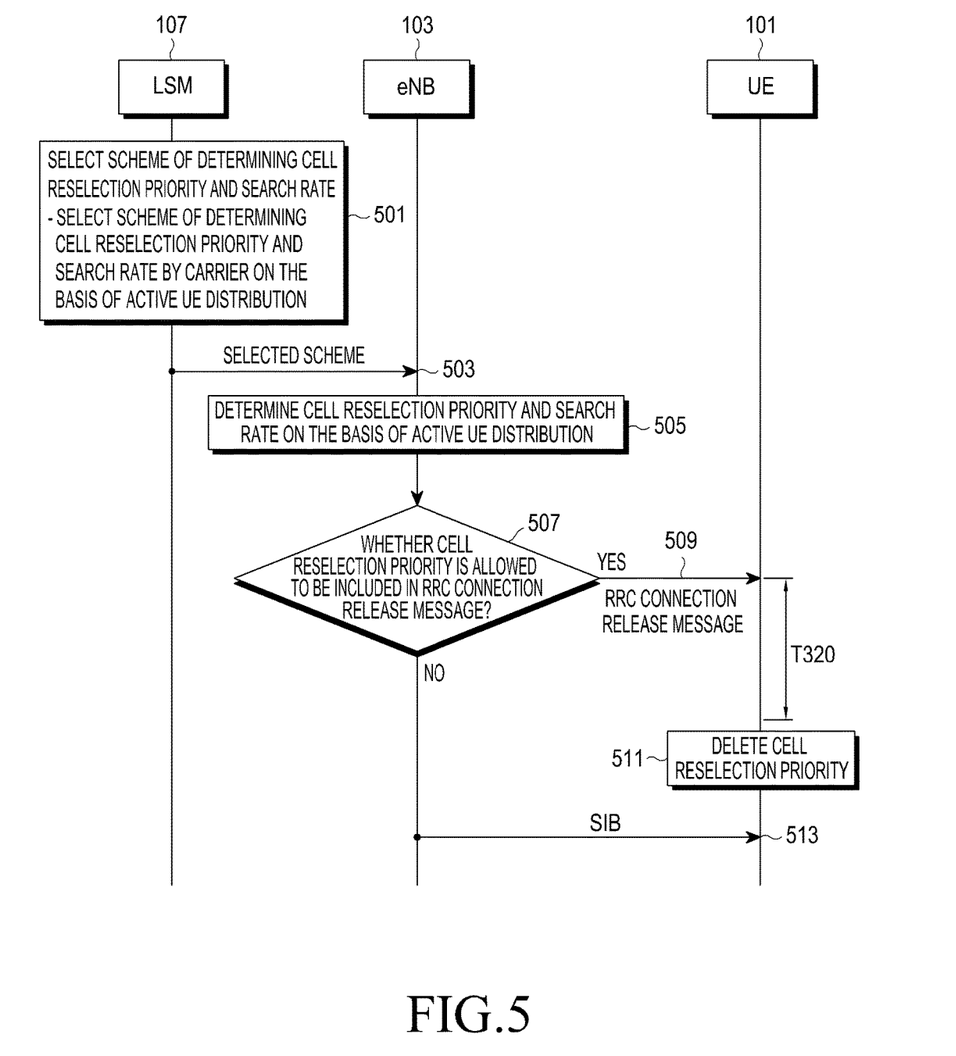
FIG. 5 is a flowchart illustrating a method for distributing an idle UE by a carrier in a mobile communication system according to a fifth embodiment of the present disclosure.

FIG. 5 is a flowchart illustrating a method for distributing an idle UE by a carrier in the mobile communication system according to the fifth embodiment of the present disclosure.

Referring to FIG. 5, in step S501, the LSM 107 selects a scheme of determining the cell reselection priority and the search rate. The LSM 107 selects a scheme in which the eNB 103 determines the cell reselection priority and the search rate by a carrier on the basis of an active UE according to the fifth embodiment of the present disclosure among the embodiments of the present disclosure. In step S503, the LSM 107 transmits the selected scheme to the eNB 103 such that the eNB 103 operates according to the fifth embodiment of the present disclosure.

Then, in step S505, the eNB 103 determines the cell reselection priority and the search rate by a carrier on the basis of the active UE. A scheme, in which the eNB 103 determines the cell reselection priority and the search rate by a carrier on the basis of the carrier distribution, may be shown in Table 5 below as one example.

TABLE 5

| Bandclass | Carrier (ARFCN) (system parameter) | Active UE Load rate (Active UE/Maximum UE/carrier) | Cell reselection priority | Search rate | Cell reselection probability per carrier |
|---|---|---|---|---|---|
| 1.9 GHz | Aaaa | 0.4 | 7 | 6 | 6/10 |
| 800M | Bbbb | 0.7 | 6 | 3 | 3/10 |
| ZZ frq#1 | Cccc | 0.9 | 5 | 1 | 1/10 |

In Table 5 above, the carrier distribution, the search rate by a carrier, and the cell reselection probability per carrier are determined using Equation 4, Equation 5, and Equation 6 above. Furthermore, when the search rate of the carrier i has the largest value, since availability is large, the cell reselection priority by a carrier is assigned in sequence of {7,6,5,4,3,2,1}.

In step S507, the eNB 103 determines whether the determined cell reselection priority by a carrier is allowed to be included in the RRC connection release message. When the determined cell reselection priority by a carrier is allowed to be included in the RRC connection release message, the eNB 103 transmits the determined cell reselection priority by a carrier to the UE 101 through the RRC connection release message in step S509. When a preset timer is expired, the UE 101 deletes the reselection priority received through the RRC connection release message in step S511. When the determined cell reselection priority by a carrier is not allowed to be included in the RRC connection release message, the eNB 103 transmits the determined cell reselection priority by a carrier to the UE 101 through the SIB in step S513.

Figure 8:
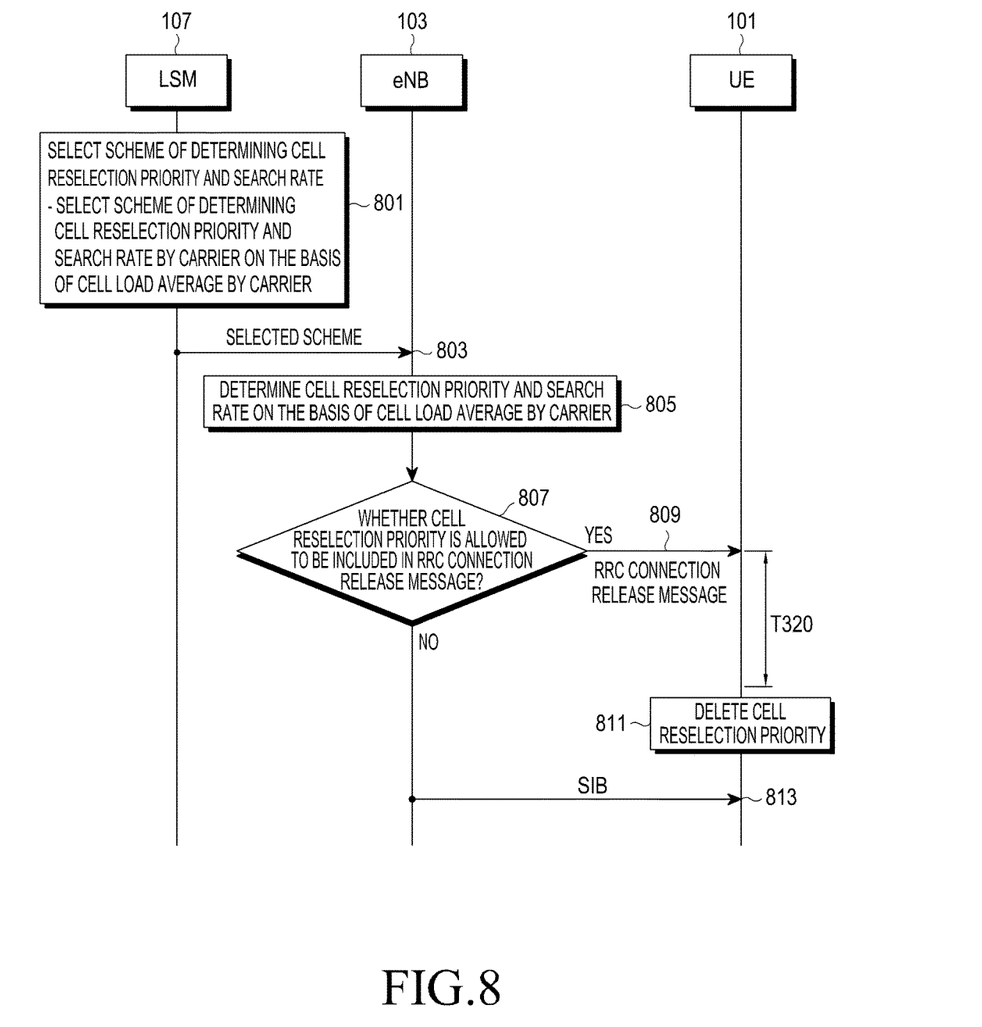
FIG. 8 is a flowchart illustrating a method for distributing an idle UE by a carrier in a mobile communication system according to a sixth embodiment of the present disclosure.

FIG. 8 is a flowchart illustrating a method for distributing an idle UE by a carrier in the mobile communication system according to the sixth embodiment of the present disclosure.

Referring to FIG. 8, in step S801, the LSM 107 selects a scheme of determining the cell reselection priority and the search rate. The LSM 107 selects a scheme in which the eNB 103 determines the cell reselection priority and the search rate by a carrier on the basis of cell load average information by a carrier according to the sixth embodiment of the present disclosure among the embodiments of the present disclosure. In step S803, the LSM 107 transmits the selected scheme to the eNB 103 such that the eNB 103 operates according to the sixth embodiment of the present disclosure.

In step S805, the eNB 103 determines the cell reselection priority and the search rate by a carrier on the basis of the cell load average information by a carrier. A scheme, in which the eNB 103 determines the search rate by a carrier on the basis of the cell load average information by a carrier, may be shown in Table 6 below as one example.

TABLE 6

| Band Class | Carrier (ARFCN) | Cell load average by carrier | Search rate | Cell reselection probability per carrier |
|---|---|---|---|---|
| 1.9 GHz | Aaaa | 70% | 3 | 3/8 |
| 800M | Bbbb | 50% | 5 | 5/8 |

In Table 6 above, the cell load average by a carrier is determined on the basis of cell load information of a serving cell and a neighbor cell derived by percentage. In a carrier of the serving cell, n-1 neighbor cells with high priority are selected from among the serving cell and neighbor cells of the corresponding carrier managed by the serving cell, and a cell load average of the n cells including the serving cell is calculated. In a carrier different from the carrier of the serving cell, n neighbor cells with high priority are selected from among the neighbor cells of the corresponding carrier managed by the serving cell, and a cell load average is calculated. An operator can set n that is a parameter, which is used when the cell load average by a carrier is calculated, through the LSM.

In Table 6 above, the search rate by a carrier may be determined using Equation 7 below.

$$S_i = \text{round}\left\{\left(1 - \frac{g_i}{100}\right) \times 10\right\}$$ Equation 7

In Equation 7 above, gi indicates a cell load average of the carrier i, which is expressed by percentage, and round { } indicates a round-off function.

Figure 6:
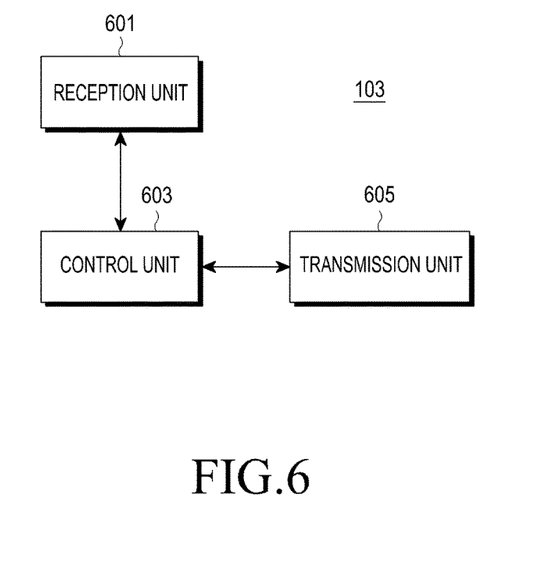
FIG. 6 is a block diagram schematically illustrating a configuration of an eNB 103 according to an embodiment of the present disclosure.

FIG. 6 is a block diagram schematically illustrating a configuration of the eNB 103 according to the embodiment of the present disclosure.

Referring to FIG. 6, the eNB 103 includes a reception unit 601, a control unit 603, and a transmission unit 605.

The reception unit 601 receives the scheme of determining the cell reselection priority and the search rate from the LSM 107. The reception unit 601 receives at least one of the cell reselection priority and the search rate from the operator according to the aforementioned embodiments of the present disclosure. Furthermore, the reception unit 601 receives cell load information on neighbor cells included in a corresponding eNB from a neighbor eNB.

The control unit 603 controls the operations of the reception unit 601 and transmission unit 603, and determines at least one of the cell reselection priority and the search rate on the basis of the carrier distribution or the distribution of active UEs according to the received scheme of determining the cell reselection priority and the search rate (that is, according to the aforementioned embodiments of the present disclosure).

The transmission unit 605 transmits the cell reselection priority to the UE 101.

FIG. 6 illustrates the case in which the reception unit 601 and the transmission unit 605 are provided in the form of separate units, but it is of course that the reception unit 601 and the transmission unit 605 may be provided in the form of a single unit.

Hereinafter, the operation of each unit included in the eNB 103 will be described in detail with reference to FIG. 7.

Figure 7:
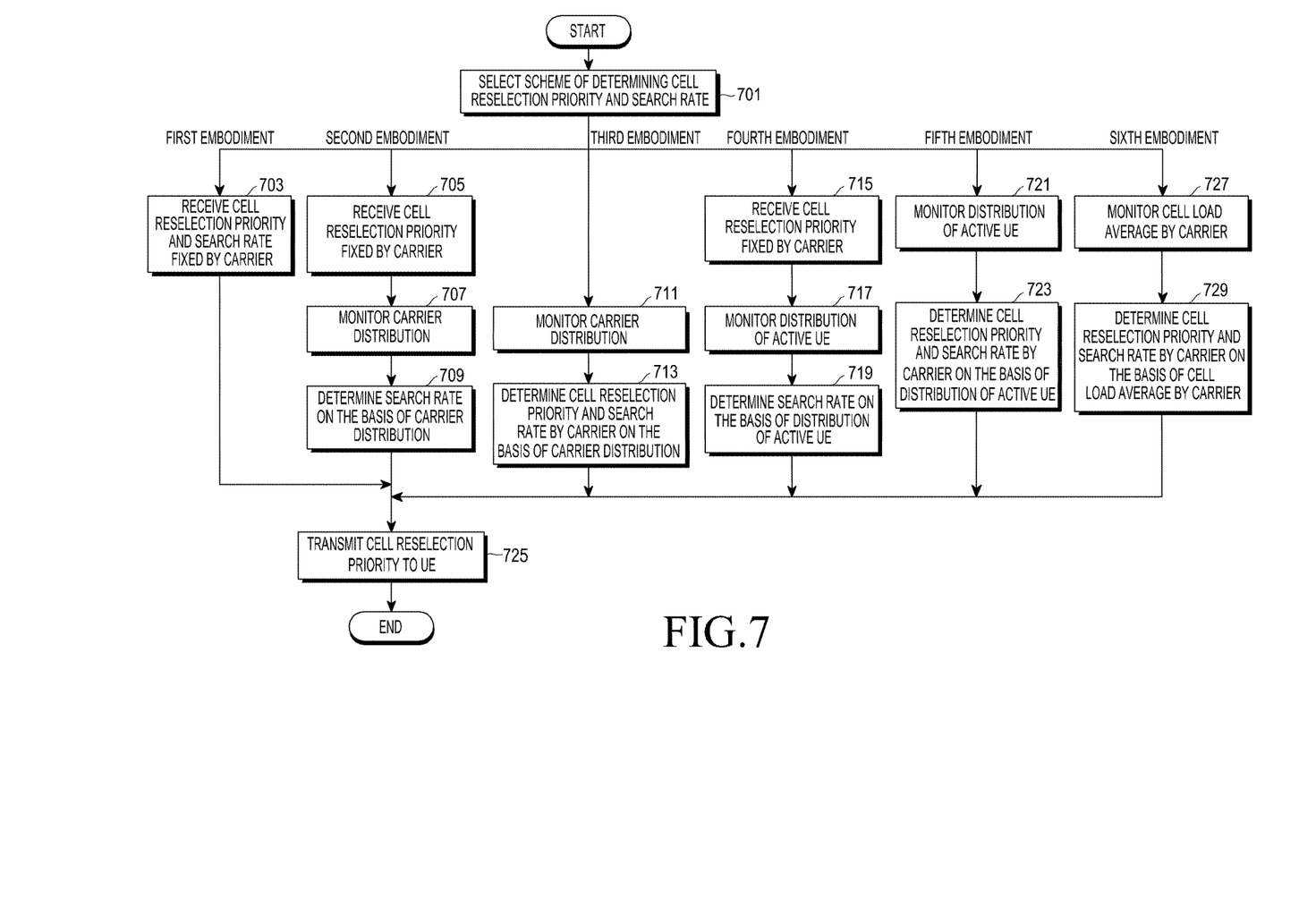
FIG. 7 is a flowchart illustrating a method in which an eNB 103 according to an embodiment of the present disclosure distributes an idle UE.

FIG. 7 is a flowchart illustrating a method in which the eNB 103 according to an embodiment of the present disclosure distributes an idle UE.

Referring to FIG. 7, in step S701, the reception unit 601 receives a scheme of determining the cell reselection priority and the search rate from the LSM 107. Step S703, step S705, step S711, step S715, or step S721 is performed according to the scheme of determining the cell reselection priority and the search rate.

That is, according to the first embodiment of the present disclosure, in step S703, the reception unit 601 receives the cell reselection priority and the search rate fixed by a carrier from the operator. In step S725, the transmission unit 605 transmits the received cell reselection priority fixed by a carrier to the UE 101. The operations of the reception unit 601 and the transmission unit 605 are controlled by the control unit 603.

According to the second embodiment of the present disclosure, in step S705, the reception unit 601 receives the cell reselection priority fixed by a carrier from the operator. The control unit 707 monitors the carrier distribution through the reception unit 601 in step S707 and determines the search rate on the basis of the monitored carrier distribution in step S709. In step S725, the transmission unit 605 transmits the received cell reselection priority fixed by a carrier to the UE 101.

According to the third embodiment of the present disclosure, the control unit 707 monitors the carrier distribution through the reception unit 601 in step S711 and determines the cell reselection priority and the search rate by a carrier on the basis of the monitored carrier distribution in step S713. In step S725, the transmission unit 605 transmits the determined cell reselection priority by a carrier to the UE 101.

According to the fourth embodiment of the present disclosure, in step S715, the reception unit 601 receives the cell reselection priority fixed by a carrier. The control unit 707 monitors the distribution of active UEs through the reception unit 601 in step S717 and determines the search rate on the basis of the monitored distribution of active UEs in step S719. In step S725, the transmission unit 605 transmits the received cell reselection priority fixed by a carrier to the UE 101.

According to the fifth embodiment of the present disclosure, the control unit 603 monitors the distribution of active UEs through the reception unit 601 in step S721 and determines the cell reselection priority and the search rate by a carrier on the basis of the monitored distribution of active UEs in step S723. In step S725, the transmission unit 605 transmits the determined cell reselection priority by a carrier to the UE 101.

According to the sixth embodiment of the present disclosure, the control unit 603 monitors a cell load average through the reception unit 601 in step S727 and determines the cell reselection priority and the search rate by a carrier on the basis of the monitored cell load average by a carrier in step S729. In step S725, the transmission unit 605 transmits the determined cell reselection priority by a carrier to the UE 101.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

The invention claimed is:

1. A method for cell reselection of an idle terminal by a base station in a multi-carrier based mobile communication system, the method comprising:
   determining a cell reselection priority of each carrier for a terminal, based on a load of the each carrier;
   generating information associated with the determined cell reselection priority of the each carrier; and
   transmitting, to the terminal, radio resource control (RRC) connection release message including the information associated with the determined cell reselection priority of the each carrier, the information associated with the determined cell reselection priority being used for the terminal to perform a cell reselection in an idle mode, and
   wherein the load of the each carrier is determined based on carrier distribution calculated by a ratio of a number of carriers using a same frequency band in the base station to a maximum number of carriers in the base station.

2. The method of claim 1, wherein the load of the each carrier is determined based on distribution of active terminals determined based on a number of the active terminals using the each carrier.

3. The method of claim 1, further comprising monitoring distribution of active terminals.

4. The method of claim 1, wherein the load of the each carrier is determined based on a cell load average determined based on cell load information of a serving cell and at least one neighbor cell.

5. A base station for supporting cell reselection of an idle terminal in a multi-carrier based mobile communication system, the base station comprising:
- a transceiver configured to transmit or receive a signal; and
- a controller configured to:
- determine a cell reselection priority of each carrier for a terminal, based on a load of the each carrier,
- generate information associated with the determined cell reselection priority of the each carrier, and
- control the transceiver to transmit, to the terminal, radio resource control (RRC) connection release message including the information associated with the determined cell reselection priority of each of a plurality of carriers, the information associated with the determined cell reselection priority being used for the terminal to perform a cell reselection in an idle mode,
- wherein the load of the each carrier is determined based on carrier distribution calculated by a ratio of a number of carriers using a same frequency band in the base station to a maximum number of carriers in the base station.

6. The base station of claim 5, wherein the load of the each carrier is determined based on distribution of active terminals determined based on a number of the active terminals using each of the plurality of carriers.

7. The base station of claim 5, wherein the controller is configured to monitor distribution of active terminals.

8. The base station of claim 5, wherein the load of the each carrier is determined based on a cell load average determined based on cell load information of a serving cell and at least one neighbor cell.

9. A terminal for performing cell reselection in a multi-carrier based mobile communication system, the terminal comprising:
- a transceiver configured to transmit or receive a signal; and
- a controller configured to:
- control the transceiver to receive radio resource control (RRC) connection release message including information associated with cell reselection priority of each carrier from a base station, the information generated by the base station, and
- perform the cell reselection, based on the information associated with cell reselection priority of each of a plurality of carriers, when the terminal in an idle mode,
- wherein the cell reselection priority of each of the plurality of carriers is determined based on a load of each of the plurality of carriers,
- wherein the load of the each carrier is determined based on carrier distribution calculated by a ratio of a number of carriers using a same frequency band in the base station to a maximum number of carriers in the base station.

10. The terminal of claim 9, wherein the load of the each carrier is determined based on distribution of active terminals determined based on a number of the active terminals using each of the plurality of carriers.

11. The terminal of claim 9, wherein the load of the each carrier is determined based on a cell load average determined based on cell load information of a serving cell and at least one neighbor cell.

* * * * *